(12) United States Patent
Arvidsson

(10) Patent No.: US 9,357,717 B2
(45) Date of Patent: Jun. 7, 2016

(54) TREE DELIMBING METHOD AND DEVICE

(75) Inventor: Hans Arvidsson, Grangärde (SE)

(73) Assignee: Log Max AB, Grangarde (SE)

( * ) Notice: Subject to any disclaimer, the term of this patent is extended or adjusted under 35 U.S.C. 154(b) by 630 days.

(21) Appl. No.: 13/001,346

(22) PCT Filed: Jun. 23, 2009

(86) PCT No.: PCT/SE2009/050797
§ 371 (c)(1),
(2), (4) Date: Mar. 9, 2011

(87) PCT Pub. No.: WO2009/157864
PCT Pub. Date: Dec. 30, 2009

(65) Prior Publication Data
US 2011/0265912 A1   Nov. 3, 2011

(30) Foreign Application Priority Data

Jun. 25, 2008  (SE) ...................................... 0801495

(51) Int. Cl.
*A01G 23/083*   (2006.01)
*A01G 23/095*   (2006.01)
*B27L 1/00*   (2006.01)

(52) U.S. Cl.
CPC ............ *A01G 23/083* (2013.01); *A01G 23/095* (2013.01); *B27L 1/00* (2013.01)

(58) Field of Classification Search
CPC ...... A01G 23/083; A01G 23/095; B27L 1/00; B27L 1/06
USPC .............................................. 144/24.13, 343
See application file for complete search history.

(56) References Cited

U.S. PATENT DOCUMENTS

| 3,939,996 | A | * | 2/1976 | Golob | .................. | A01G 23/085 |
| | | | | | | 280/145 |
| 4,898,218 | A | | 2/1990 | Linderholm | | |
| 5,732,754 | A | * | 3/1998 | Moisio | ....................... | 144/24.13 |

(Continued)

FOREIGN PATENT DOCUMENTS

| EP | 0 346 308 A1 | 12/1989 |
| FI | 106 092 B | 11/2000 |

(Continued)

OTHER PUBLICATIONS

International Search Report for corresponding application No. PCT/SE2009/050797 dated Sep. 1, 2009.

(Continued)

*Primary Examiner* — Matthew G Katcoff
(74) *Attorney, Agent, or Firm* — Renner, Otto, Boisselle & Sklar, LLP

(57) ABSTRACT

Method and device for delimbing a tree trunk (60) in a compliant gripping state defined by a set of limbing knives (18, 24, 26, 28) enclosing the trunk. The limbing knives are repeatedly adjusted through a control unit (46) for adaption of the gripping state to a varying thickness of the trunk when the trunk is advanced between the knives for the delimbing of the trunk. The invention comprises entering a desired compliance (D1) of the gripping state in the control unit (46), detecting an actual compliance (d) of the gripping state, and performing each adjustment of the limbing knives via the control unit until the actual compliance (d) corresponds to the desired compliance (D1).

4 Claims, 4 Drawing Sheets

(56) References Cited

U.S. PATENT DOCUMENTS

| | | |
|---|---|---|
| 6,263,931 B1 | 7/2001 | Ericksson |
| 6,318,425 B1 * | 11/2001 | Niemi .......................... 144/343 |
| 2008/0030188 A1 * | 2/2008 | Ponziani et al. ........... 324/207.2 |

FOREIGN PATENT DOCUMENTS

| | | |
|---|---|---|
| WO | 00/15025 A1 | 3/2000 |
| WO | 02/23973 A1 | 3/2002 |
| WO | 2006/128786 | 12/2006 |

OTHER PUBLICATIONS

Extended European Search Report for corresponding European Application No. 09770489.4 dated Apr. 15, 2014.

Office Action issued in corresponding Canadian Application No. 2,728,465 dated Jul. 9, 2015.

* cited by examiner

TREE DELIMBING METHOD AND DEVICE

This application is a national phase of International Application No. PCT/SE2009/050797 filed Jun. 23, 2009 and published in the English language.

TECHNICAL FIELD

This invention is relates to a tree delimbing method and device for delimbing a tree trunk in a compliant gripping state defined by a set of limbing knives enclosing the trunk, comprising repeated adjustment of the limbing knives through a control unit for adaption of the gripping state to a varying thickness of the trunk when the trunk is advanced between the knives for the delimbing of the trunk.

BACKGROUND

When delimbing tree trunks using a tree processing assembly, it is desirable to cut the branches as close as possible to the trunk. During a delimbing operation it is therefore necessary to adapt the grip of the surrounding knives to the varying thickness of the trunk section that is currently in the grip.

In a prior art delimbing device of the above mentioned type and disclosed in U.S. Pat. No. 4,898,218, the compliance of the gripping state is predetermined by changing a closing extent of a gripping means provided with the limbing knives each time a top face of the trunk has been moved a predetermined distance in a direction of movement for a resiliently compliant limbing knife. In the example disclosed in the above patent, there is provided a switch which is actuated by the compliant limbing knife so as to when the switch is not actuated by the limbing knife, the closing extent of the gripping means increases to lift the tree trunk in the delimbing device until the compliant limbing knife actuates the switch that then interrupts the closing of the gripping means. When the tree trunk advances further in the delimbing device in the direction to its top end, the switch again becomes non-actuated by the returning resiliently compliant limbing knife such that the closing extent of the gripping means once more increases. This procedure is repeated until the whole tree trunk has been advanced through the delimbing device.

A disadvantage of the prior art device is that the compliance of the gripping state, i.e. the remaining free stroke of travel of the resilient limbing knife, is invariable after each increase of the extent of closing of the grip of the trunk. However, in order to obtain a good delimbing operation, it may be necessary to cut the branches of different types of tree trunks with mutually different compliance or remaining free stroke of travel of the resilient limbing knife. Birch trees, for example, can have coarse branches that may excessively load the processing assembly when attempting to cut the branches too close to the trunk. The gripping state should then have a relatively large compliance, capable of allowing the tree trunk to move away from the limbing knives, or allowing the limbing knives to move away from the tree trunk a further distance, when one or more such coarse branches are coming into knife engagement. The compliance, play or remaining free stroke of travel of the gripping state should then be about 30 to 40 mm. On the other hand, spruce trees, for example, may have a linearly tapering trunk with relatively thin branches. The gripping state should then have a relatively small compliance so as to cut the branches close to the trunk. If the compliance then is too large, the elastic branches may resiliently bend toward the trunk and slide along the limbing knives without being cut. The compliance, play or free stroke of travel of the gripping state may then be about 5 mm.

DISCLOSURE OF THE INVENTION

An object of the present invention is to further develop a method and a device of the type defined above so that it is capable of more effectively delimbing tree trunks of mutually differing branch qualities.

Another object may be considered as to adapt the delimbing operation to the requirements of the actual tree trunk.

These objects are obtained by the features of the appended claims.

In one aspect of the invention, a method according to the invention comprises setting a desired compliance of the gripping state in the control unit;

detecting an actual compliance of the gripping state; and performing each adjustment of the limbing knives through the control unit until the actual compliance corresponds to the desired compliance.

Thereby the compliance of the gripping state can be adapted to the quality of the actual tree trunk. The desired compliance may empirically be determined by an operator of the device based on a judgment of the tree trunk and its branches and be set in an input unit as a category such as "Spruce", "Birch", etc. but also as a direct distance value, for example 40 mm.

While the compliance of the gripping state may be included by all limbing knives, according to one embodiment of the invention, the compliance comprises a remaining free stroke of one limbing knife resiliently engaging the trunk.

Other features and advantages of the invention may be apparent from the claims and the following detailed description of embodiments.

DETAILED DESCRIPTION OF EMBODIMENTS

Figure 1:
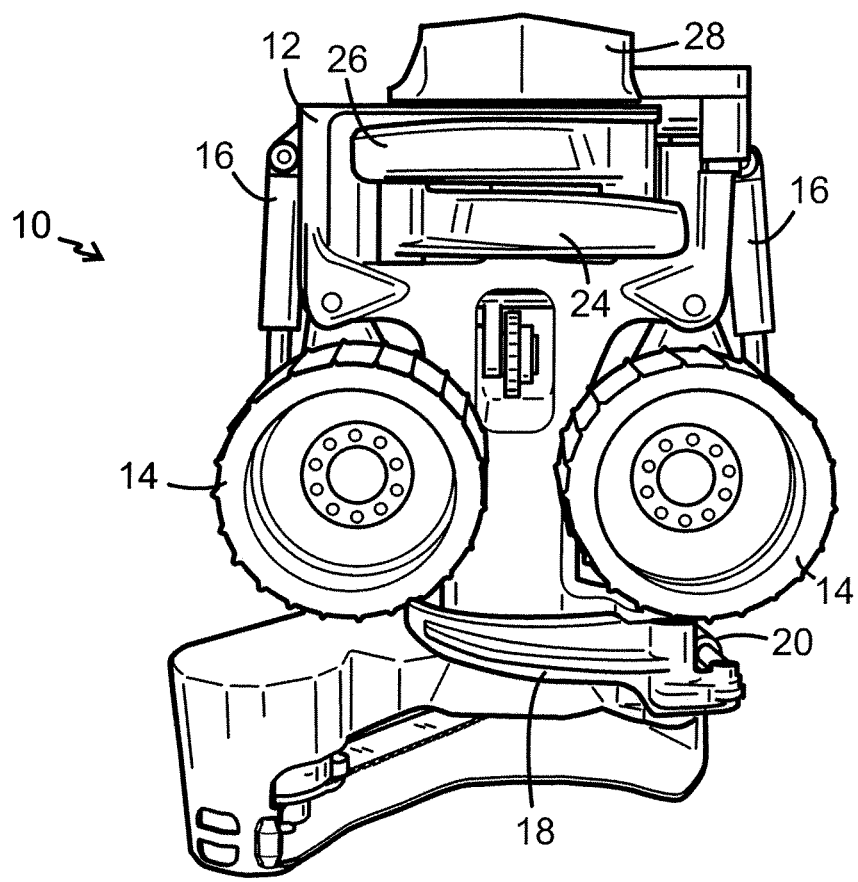
FIG. 1 is a front view of a vertically oriented tree processing assembly that may be incorporated with a device according to the invention.

FIG. 1 shows a front face of a vertically oriented tree processing assembly 10 of the single-grip type. Assembly 10 has a main body 12 supporting inter alia a pair of opposite feed wheels 14, a lower forward limbing knife 18, a pair of upper forward limbing knives 24, 26 and an upper rearward limbing knife 28.

The two feed wheels 14 are pivotally connected to the main body 12 to clamp and longitudinally feed a tree trunk 60

(FIGS. 2-5) felled by the assembly 10. The likewise pivotally connected limbing knives 18, 24, 26, 28, likewise pivotally connected to the main body 12, enclose the tree trunk to cut off branches therefrom when the trunk is advanced through the assembly.

Figure 4:
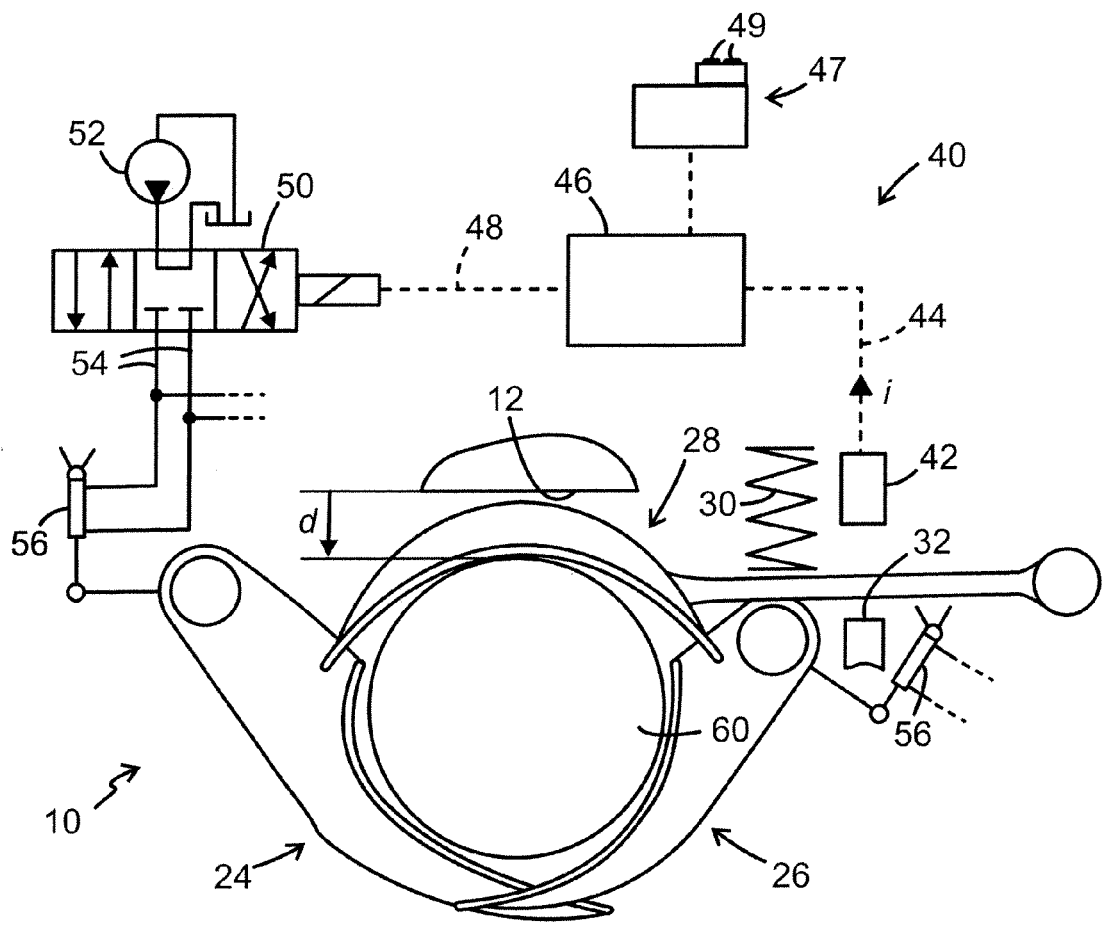
FIG. 4 is a diagrammatic front view of a horizontally oriented tree processing assembly gripping a tree trunk.
Figure 5:
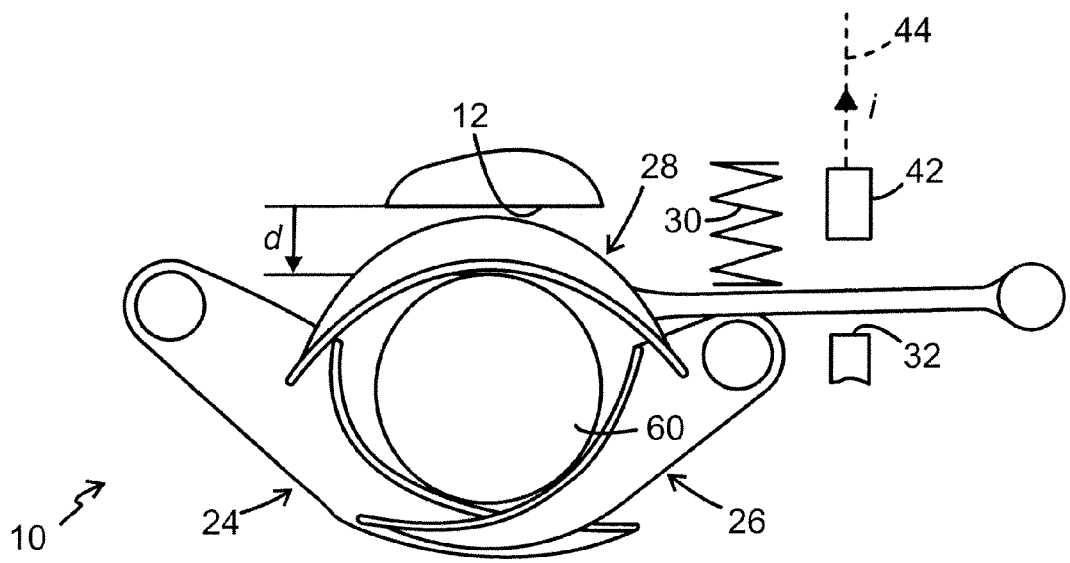
FIG. 5 is a view corresponding to FIG. 4 where the assembly is gripping a thinner section of the trunk.

Each feed wheel 14 and the limbing knives 18, 24, 26 are adjusted to their positions enclosing the trunk by means of actuators. In the examples shown, the feed wheels 14 are adjusted by respective hydraulic cylinders 16, and the lower limbing knife 18 as well as the upper forward limbing knives 24, 26 are also adjusted by respective hydraulic cylinders 20 and 56, 56 (FIG. 4). The upper rearward limbing knife 28 is resiliently forced to the tree trunk 60 by means of a spring 30 (FIGS. 4, 5).

The diagrammatic representation of FIG. 2-5 shows a horizontally oriented tree processing assembly 10 gripping a tree trunk 60 by the upper forward limbing knives 24, 26 and by the upper rearward limbing knife 28. Accordingly, the upper forward limbing knives 24, 26 as well as the lower forward limbing knife 18 (indicated only in FIG. 2) support the weight of the horizontally oriented tree trunk 60 received in the processing assembly 10.

To facilitate the description, the function of the adjustable lower forward limbing knife 18 is omitted. If the assembly 10 is provided with such a limbing knife 18, in the following description, limbing knife 18 is understood to be controlled in a manner corresponding to the control of the adjustable upper forward limbing knives 24, 26.

Figure 2:
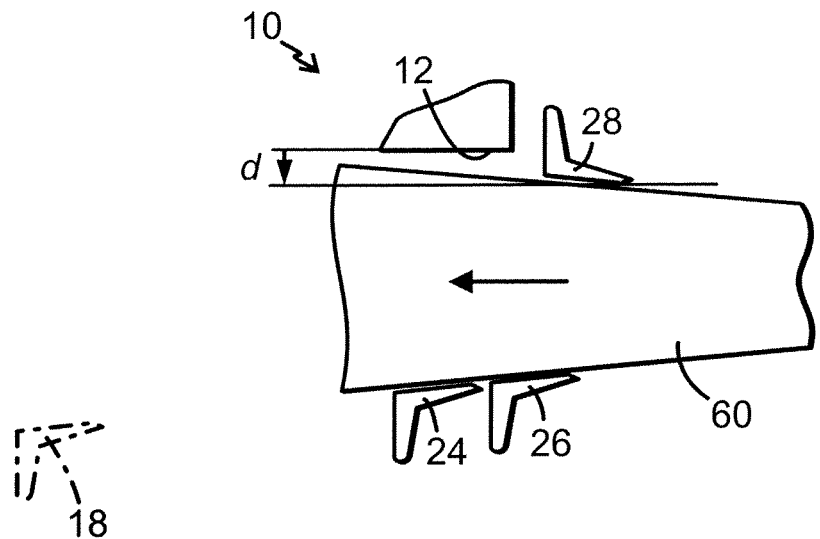
FIG. 2 is a diagrammatic side view with parts broken away of a tree trunk received in a horizontally oriented tree processing assembly.
Figure 3:
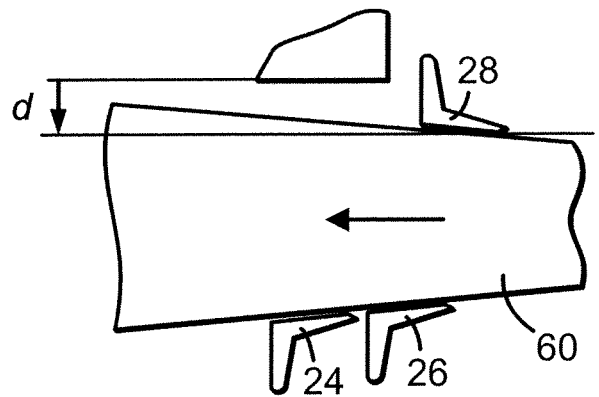
FIG. 3 is a view corresponding to FIG. 2 illustrating an increasing distance between the tree trunk and a bottom face of the assembly when the trunk is advanced therethrough.

When the horizontally oriented, thus gripped tree trunk 60 is advanced to the left through the assembly in the manner that is diagrammatically shown in FIGS. 2 and 3, i.e. from the butt end to the top end, the actual distance d from the trunk to a bottom face of the main body 12 of the assembly 10 will increase. The spring-loaded limbing knife 28 will then follow the movement downwards of the top face of the trunk 30 and—to a limited extent—also upwards. Distance d may then be considered as a measurement of the compliance of the enclosing engagement of the limbing knives to the vertical movements and variations of thickness during the feed of the trunk. The bottom face of the main body may represent an upper end position, formed by an upper stop (not shown) for the spring-loaded limbing knife 28, the lower end position of which may be defined by a lower stop 32 (FIGS. 4, 5) of the assembly 10.

The distance d is critical for a correct delimbing operation. Distance d may be regarded as representing the play or remaining stroke of travel of the spring-loaded limbing knife 28—and thereby also the play in the vertical direction of the horizontally oriented tree trunk 30.

If, on the one hand, the play is too small, the trunk may get stuck in the assembly 10 or subject the limbing knives to a far too high load by cutting into far too massive wood sections of the branches or the trunk 60. If, on the other hand, the play is too large, the branches of the trunk 60 may bend to the trunk and slide under the the knives whereby they will not be cut off during the delimbing operation.

As is apparent from FIGS. 4 and 5, the actual distance d is detected by a proximity sensor 42, such as an analog inductive or magnetic proximity sensor. Proximity sensor 42 is continuously signaling the actual distance d, for example as an electric current i, via a signal connection 44 to an electronic control unit 46 of a control system 40. In one embodiment, a processor (not shown) in the control unit 40 can be programmed to emit a control signal via a signal connection 48 to a magnet valve 50 when the electric current indicates that the distance d has risen to a critical value D1 (FIG. 6) that may be stored in a memory (not shown) in the control unit 46. Valve 50 then opens a path between a hydraulic pump 52 and the respective hydraulic cylinders 56. The limbing knives 24, 26 will then further tighten the grip of the tree trunk 60, whereby the distance d decreases to an adjoining value D2 (FIG. 6) when the tree trunk 60 is lifted further up in the assembly 10. During the continuing feed of the trunk 60 in the assembly 10, the distance d may further increase until it again reaches the critical value D1, whereupon the above process is repeated. The number of repetitions of this process depends on the magnitude of the interval D1-D2 and the length of the tree trunk. The magnitude of the interval D1-D2 may vary depending on the accuracy, for example, depending on inertia and delay in the hydraulic system and influence of hysteresis, of the control system 40 and the sensor 42.

Figure 6:
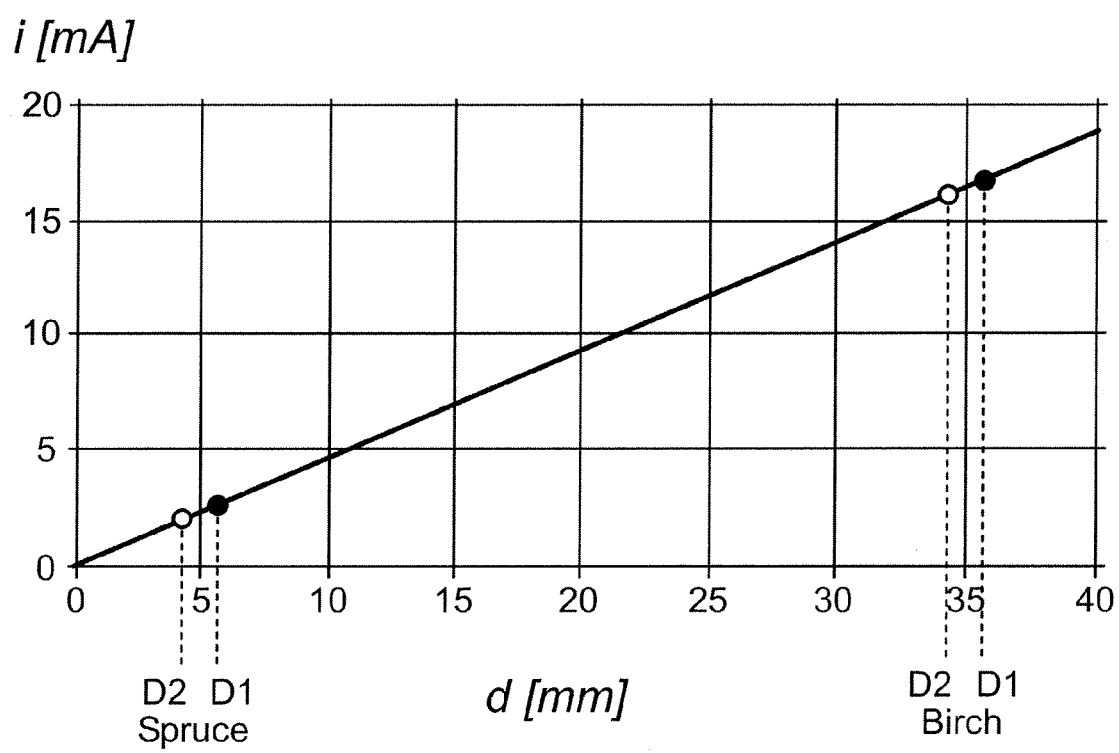
FIG. 6 is a graph showing a characteristic of a proximity sensor that may be incorporated with a device according to the invention Throughout the drawing, components having similar function have identical reference numbers.

As indicated in FIG. 6, in certain circumstances, D1 and D2 may have relatively large values that typically amount to between 30 and 40 mm. This means that the limbing knife 28 has a relatively large play above the tree trunk 60. Such a case may be suitable for trunks of birch, the branches of which may be relatively massive close to the trunk. The large play of the limbing knife 28 will then allow the knife to be forced further out from the trunk before it cuts the branch. The spring-loaded limbing knife 28 and also the other limbing knives can have such a cutting angle that they are guided away from the trunk to a certain amount during the cutting operation. The process may then also allow that the whole trunk 60 is forced away from the adjustable limbing knives 24, 26 when these knives encounter massive branches. The result, however, is that a larger play d will generally allow coarse branches to be cut off at a larger distance from the trunk 60 than will a smaller play. The spring-loaded limbing knife 28 and the weight of the trunk 60 will, however, provide for that the thinner branches still are cut close to the trunk.

A relatively small play where D1 and D2 have relatively small values of about 5 mm may be suitable when delimbing trunks of spruce, for example, where generally the trunk surface tapers relatively linearly and the branches are relatively thin and therefore are quite easy to cut off. The branches are then cut close to the trunk 60 and are thereby prevented from bending against the trunk and sliding along and past the limbing knives 18, 24, 26, 28.

In order to take account for varying quality of tree trunks where at least certain branches need to be cut off at different distances from the trunk to obtain a good delimbing result for a certain processing assembly, the desired play or the above-mentioned critical value D1 can be set in the control unit 46 prior to each delimbing operation. To this end, the control unit 46 is provided with an input unit 47, having one or more push buttons or keys 49, for example, in the vehicle (not shown) that supports the assembly 10. In one embodiment of the invention, the operator (not shown) then makes a visual examination of the tree to be felled, and, after an empirical conclusion, makes a decision about the quality of the trunk, for example in the form of a category, that is entered into the unit 47. Apart from "Birch" and "Spruce", in a set of categories to be entered, also other tree species, sub-categories such as "Slender Birch", as well as varying qualities such as decay or rotten wood, may be included. An experienced operator may also enter the value of D1 directly, if the control unit 46 so allows. The set of keys 49 of the control unit 47 may be located accessible for the operator in the proximity of a joy stick (not shown), for example, provided for controlling another function of the tree processing assembly.

To relieve the operator, in the scope of the appended claims, it is at least imaginable to perform the setting of tree trunk category automatically by using a camera and an image processing system (not shown) having the capability of identifying the different categories of tree trunks.

The foregoing detailed description is given primarily for clearness of understanding and no unnecessary limitations are to be understood therefrom. Modifications will become obvious to those skilled in the art upon reading this disclosure and may be made without departing from the spirit of the invention or the scope of the appended claims.

The invention claimed is:

1. A method of delimbing a tree trunk using an assembly including a main body with a bottom face and a set of limbing knives enclosing the trunk, the limbing knives including a spring-loaded limbing knife that is forced against the trunk, wherein the spring-loaded limbing knife has a compliance associated therewith, wherein the compliance of the spring-loaded limbing knife is the length of a stroke of travel of the spring-loaded limbing knife, wherein the bottom face of the main body acts as an upper stop for the spring-loaded limbing knife such that the stroke of travel of the spring-loaded limbing knife extends from the trunk at one extreme to the bottom face of the main body at another extreme, and wherein the compliance of the spring-loaded limbing knife may be adjusted depending on the characteristics of the tree trunk to be delimbed,
the method comprising:
using a control unit to repeatedly adjust the limbing knives for adaption to a varying thickness of the trunk when the trunk is advanced between the knives for the delimbing of the trunk;
setting a desired compliance of the spring-loaded limbing knife in the control unit;
detecting and continuously signaling an actual compliance of the spring-loaded limbing knife; and
performing the adjustments of the limbing knives using the control unit until the actual compliance of the spring-loaded limbing knife corresponds to the desired compliance of the spring-loaded limbing knife.

2. A device for delimbing a tree trunk, comprising
an assembly, the assembly comprising a main body, the main body comprising a bottom face;
a set of limbing knives adapted to enclose the trunk, said set of limbing knives including a spring-loaded limbing knife adapted to be forced against the trunk, wherein the spring-loaded limbing knife has a compliance associated therewith, wherein the compliance of the spring-loaded limbing knife is the length of a stroke of travel of the spring-loaded limbing knife, and wherein the bottom face of the main body of the assembly is adapted to act as an upper stop for the spring-loaded limbing knife such that the stroke of travel of the spring-loaded limbing knife extends from the trunk at one extreme to the bottom face of the main body at another extreme;
actuators for repeated adjustment of the limbing knives through a control unit for adaption to a varied thickness of the trunk when the trunk is advanced between the knives for the delimbing of the trunk;
an input unit for entering a desired compliance of the spring-loaded limbing knife into the control unit; and
a proximity sensor for detecting an actual compliance of the spring-loaded limbing knife;
wherein the control unit controls the actuators until the actual compliance of the spring-loaded limbing knife corresponds to the desired compliance of the spring-loaded limbing knife, thereby making it possible to adapt the compliance of the spring-loaded limbing knife to the quality of the tree trunk to be delimbed.

3. The device according to claim 2, wherein the proximity sensor is an analog inductive sensor.

4. The device according to claim 2, wherein the proximity sensor is a magnetic sensor.

* * * * *